US006205601B1

(12) United States Patent
Nessmann et al.

(10) Patent No.: US 6,205,601 B1
(45) Date of Patent: Mar. 27, 2001

(54) DEVICE FOR TRANSPORTATION OF PATIENTS

(76) Inventors: Albin Nessmann, Samenhandelstrasse 45/1; Susanne Eppler, Lichtensteinstrasse 14, both of D-72770 Reutlingen (DE)

( * ) Notice: Subject to any disclaimer, the term of this patent is extended or adjusted under 35 U.S.C. 154(b) by 0 days.

(21) Appl. No.: 09/288,250

(22) Filed: Apr. 8, 1999

(30) Foreign Application Priority Data

Apr. 8, 1998 (DE) .......................................... 298 06 422 U

(51) Int. Cl.[7] .......................................................... B60K 1/00
(52) U.S. Cl. ........................................ 5/600; 5/86.1; 5/625
(58) Field of Search .............................. 5/600, 86.1, 611, 5/625; 280/250.1, 5.514, 5.52, 6.15

(56) References Cited

U.S. PATENT DOCUMENTS

| | | | | |
|---|---|---|---|---|
| 4,834,409 | * | 5/1989 | Kramer | 180/209 |
| 4,838,563 | * | 6/1989 | Konishi et al. | 280/840 |
| 5,083,625 | * | 1/1992 | Bleicher | 180/65.1 |
| 5,535,465 | * | 7/1996 | Hannant | 5/611 |
| 5,794,639 | * | 8/1998 | Einbinder | 135/67 |
| 6,036,201 | * | 3/2000 | Pond et al. | 280/5.514 |

FOREIGN PATENT DOCUMENTS

| | | |
|---|---|---|
| 39 19 207 C1 | 11/1990 | (DE) . |
| 43 34 343 A1 | 4/1995 | (DE) . |
| 195 46 822 A1 | 6/1997 | (DE) . |
| 195 46 822 C2 | 9/1997 | (DE) . |
| 196 50 584 A1 | 6/1998 | (DE) . |
| 0 439 812 A1 | 8/1991 | (EP) . |
| 2 200 741 | 4/1974 | (FR) . |
| 2 386 305 | 11/1978 | (FR) . |

* cited by examiner

*Primary Examiner*—Terry Lee Melius
*Assistant Examiner*—Fredrick Conley
(74) *Attorney, Agent, or Firm*—Michael J. Striker

(57) ABSTRACT

A patient's transportation device has a support provided with handles and wheels on which the support is supported, the wheels being vertically adjustable.

32 Claims, 2 Drawing Sheets

DEVICE FOR TRANSPORTATION OF PATIENTS

BACKGROUND OF THE INVENTION

The present invention relates to a device for transportation of patients, which is provided with a support having handles and arranged on wheels.

Such a patient transportation device is disclosed for example in the German patent document DE 195 46 882.8. The patient transportation device disclosed in this reference has an inclination compensation between the support and a padded lying member inserted in it. Small inclinations which occur in vehicles or airplanes are therefore compensatable in a satisfactory manner. During transportation of patients on inclined terrain or over ramps, the inclination compensation possibilities of the known support are however no longer sufficient.

SUMMARY OF THE INVENTION

Accordingly, its an object of present invention to provide a patient's transportation device which avoids the disadvantages of the prior art.

In keeping with these objects and with others which will become apparent hereinafter, on feature of present invention resides, briefly stated in a patient's transportation device in which the wheels are arranged vertically adjustable individually and/or in pairs.

When the patient's transportation device is designed in accordance with the present invention, an inclination compensation on the terrain is possible by descent of the corresponding wheel or wheels.

In accordance with a preferable embodiment of the invention, the vertical adjustment of the wheels is controlled by sensors. As a result the patient's transportation device is held always automatically in a horizontal position.

A further, important advantage is obtained in the inventive device when the wheels can be lowered into the lower side of the support, so that they do not project downwardly or project downwardly only over a small part beyond the lower side of the support.

Thereby the device can be inserted into an emergency car without difficulties, and so that a lifting of the support by hands is not needed. A trough which is available in an emergency vehicle is simply pulled over the rear of the emergency vehicle, and a front end of the transportation device is displaced onto the trough. Then first the front wheel and subsequently the rear wheels are lowered in the lower side of the support, while the support is further displaced onto the trough. This means a substantial unloading not only for the patients which are no longer subjected to high vibrations during insertion of the support into emergency vehicle, but also for the emergency personnel which must no longer lift the support.

The lowering of the wheels can be also performed so that it is controlled by sensors and therefore is fully automatic. The wheels can be arranged for this purpose for example on telescopable pipes. The telescopable pipes preferably can be extendable and retractable hydraulically or electrically.

In the event when the telescopable pipes are very long, they can be supported on the lower side of the support turnably, so that for lowering of the wheels in the lower side of the support, they can be simply folded.

At least one sliding bearing can be provided in the head region of the support on the lower side of the support, and preferably formed as a roller. It facilitates the displacement of the support onto the trough of an emergency vehicle. Such a roller can be however arranged in the central region of the support.

If the wheels are not completely lowerable in the lower side of the support, they can serve for facilitation of the insertion and the support onto the trough. The wheels can be arranged either directly on the support or on a chassis, from which the support is removable. When the wheels are arranged on a chassis, the support can move on the chassis preferably from two sides.

The wheels can be provided with tires and also can be steerable and foldable, to provide a good cross-country riding of the device. When the wheels moreover have a relatively great diameter and are supported springy, the device can also move over the stairs. For moving over the stairs, it is advantageous when the wheels are provided with a chain drive.

A padded member for lying, which preferably can be composed of synthetic plastic or a carbon fiber composite material is arranged in the support and is removable from it. Such a lying member is very light and sufficiently stable. The lying member can be foldable at least in one point in a transverse direction and provided with belts, so that a patient's transportation is possible in a seating position. Moreover, a device for compensation of impact inclinations of the support can be provided between the lying member and the support. As a result, during transportation of patients in an emergency vehicle or helicopters, painful and health-hazardous impacts and forces are compensated.

For the inclination and impact compensation, preferably a sensor-controlled hydraulic or electrical system can be provided between the support and the lying member. For facilitating the handling, all functions of the device can be controllable by a control device with a two-hand operation. The actuation can be performed preferably in the region of the support handles. Therefore, the corresponding operation can be activated during the displacement or carrying of the support.

It is further desirable to provide a patient transportation device which makes superfluous a transfer of the patients to another bed. In the event of having injuries, transferring of patients to another bed after their arrival in the hospital on the support from the emergency vehicle for their treatment in a hospital, such as for example shock room, computer tomography, operative accommodation and post-operative monitoring is connected with high health risks. It is therefore advantageous when in the support and/or in the frame, devices for monitoring and maintaining the vital parameters of the patients can be integrated. For example monitoring devices, in particular for monitoring heart activity, blood pressure, and body temperature can be integrated. Also, one of several ventilation devices can be provided as well.

With the support designed in such a manner, a seriously injured patient can be connected in the emergency vehicles to the monitoring and treatment devices and during a travel through the stations of a hospital, such as shock room, a computer tomography, an operation room can be held on the device. Also, after the operation the patient again can be held on the transportation device and monitored and treated afterwards. For this purpose, the device can be provided with infusion, and/or injection pumps, a pulse oximeter, a capnogriaph as well as a secretion aspirator. Also, poles with monitors, injection pumps, illumination devices, etc can be mounted on the device. When the device is equipped in this manner, receiving of the patients in the intensive station can be superfluous. The whole device forms a self-sufficient unit which requires no connections to the stationarily installed devices and thereby can be completely installed and simply transported.

One or several batteries and/or a circuit connection can be provided for a current supply. Thereby also a secondary transportation to other hospitals can be provided without transferring to other beds.

The novel features which are considered as characteristic for the present invention are set forth in particular in the appended claims. The invention itself, however, both as to its construction and its method of operation, together with additional objects and advantages thereof, will be best understood from the following description of specific embodiments when read in connection with the accompanying drawings.

DESCRIPTION OF PREFERRED EMBODIMENTS

Figure 1:
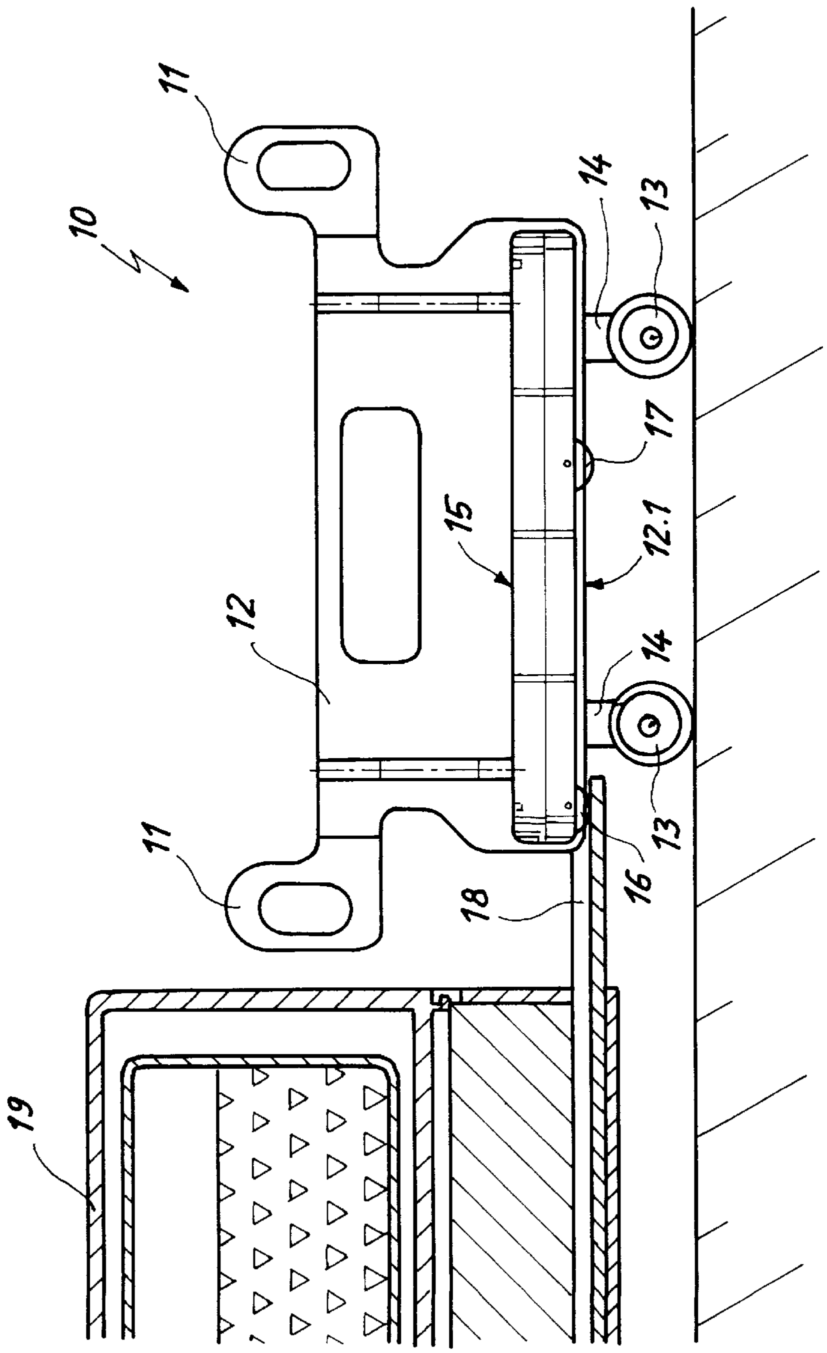
FIG. 1 is a view showing a patient's transportation device in accordance with the present invention during loading in an emergency vehicle.

A patient's transportation device shown in FIG. 1 is identified as a whole with reference numeral 1. It has the support 12 provided with handles 11. Wheels 13 are arranged at a lower side 12.1 of the support and in particular on the telescopable pipes 14. A not shown member for lying is insertable in the support 12. The line member is placed on an understructure 15 which is provided with an impact and inclination compensating system. The impact and inclination compensation system as well as the telescopable pipes 14 can be a hydraulic or electrical system and can be controlled by sensors.

Two sliding rollers 16 and 17 (castors) are arranged on the lower side 12.1 of the support 12. With these rollers, the device 10 can be placed on a pullable-out trough 18 of an emergency vehicle 19. During the placement of the support 12 on the trough 18 the wheels 13 are retracted inwardly so far that they do not project beyond the lower side 12.1 or project only insignificantly. The retraction or also folding of the wheels 13 is performed so that it is controlled by sensors and is fully automatic.

The device 10 can be loaded into the emergency vehicle 19 by the emergency personnel without application of any physical force. During unloading of the support the wheels are also extended fully automatically during pulling of the support from the trough of the emergency vehicles. Also, for the patients there is the advantage that the introduction and withdrawal of the support 12 can be performed much softer than the loading and unloading of conventional supports which must be lifted and lowered by hand. The telescopable pipes 14 of the wheels 13 make possible not only the soft and force-fine loading of the device into an emergency vehicle 9, but also they serve for inclination compensation on uneven terrain or during transportation of the patients over ramps. The telescopable pipes 14 automatically retract or extend so far, that the support 12 remains always in a horizontal position. The inclination and impact compensation system integrated in the understructure 15 of the support 12 forcedly maintains a horizontal and vibration-free position of the patients during transportation of the device in an emergency vehicle or an airplane. Therefore, the device can provide optimal conditions for very severely damaged patients.

Figure 2:
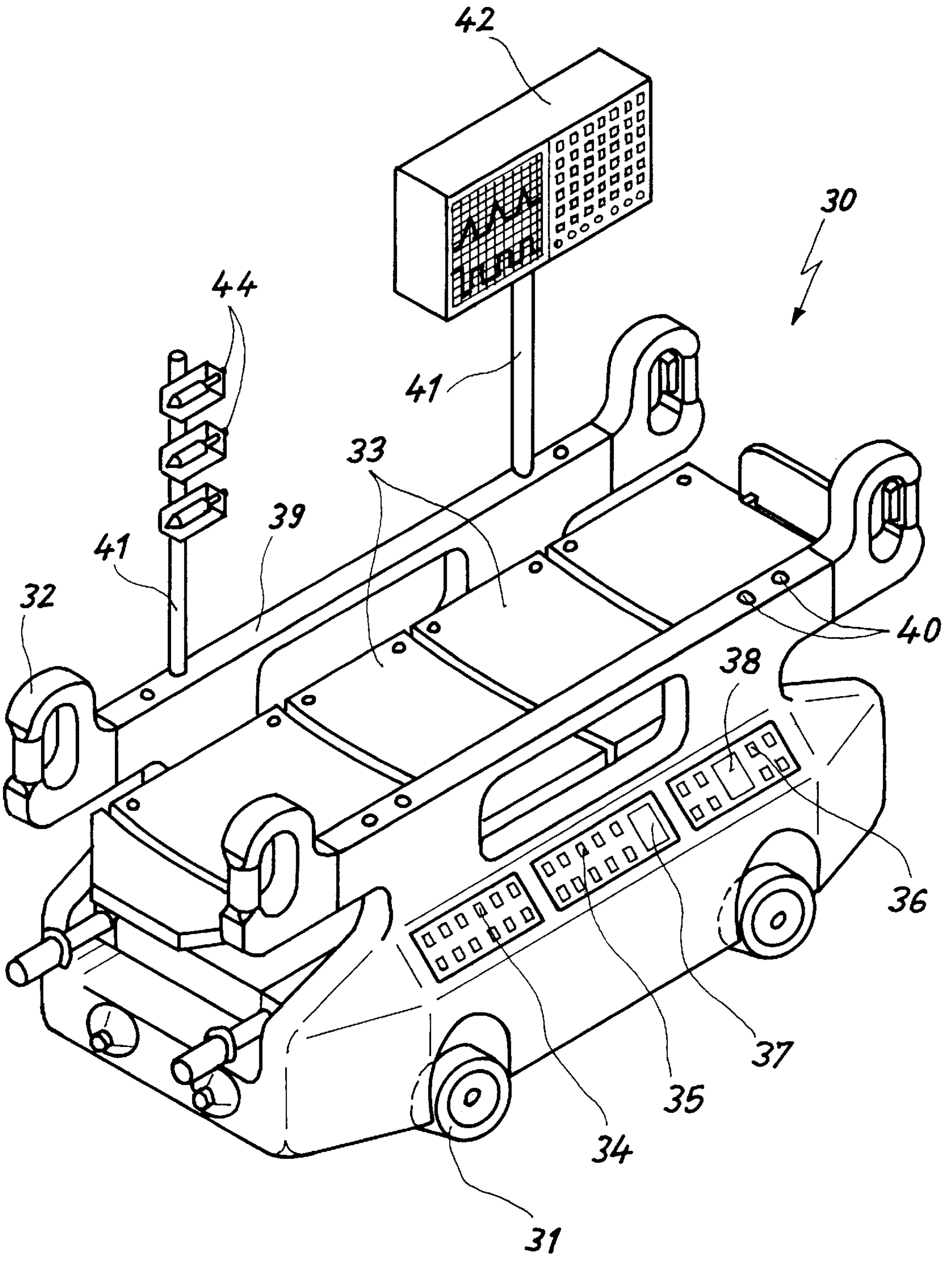
FIG. 2 is a perspective view of a second embodiment of a patient's transportation device in accordance with the present invention.

FIG. 2 shows a chassis 30 of a patient's transportation device 10, in which the member for lying is however not illustrated. The chassis 30 is formed in particular for the use in hospitals and therefore is provided with a relatively small wheels 31. The wheels 31 are adjustable as to their height and completely lowerable into the understructure of the chassis 30 and therefore the chassis 30 can be loadable into an emergency vehicle without problems. For favorable handling during transportation of a patient, handles 32 are arranged at two small sides. The patient lies on a not shown lying member, which is supported so that it is mechanically uncoupled from the chassis 30 by vibration and impact damping devices arranged under covers 33 of the chassis 30.

Serval devices for monitoring and maintaining the vital parameters of a patient are integrated in the chassis 30. Key areas 34, 35, 36 for operation of these devices are illustrated in the drawings. The key fields 35 and 36 are additionally provided with indicating elements 37 and 38. Receiving openings 40 are arranged on lateral guides 39 of the chassis 30 on the outer surface. They are used for mounting of poles 41 with monitors 42 or for injection pumps 44. It is to be understood that also further devices, such as in infusion containers, etc. can be arranged on the poles 41.

It will be understood that each of the elements described above, or two or more together, may also find a useful application in other types of constructions differing from the types described above.

While the invention has been illustrated and described as embodied in device for transportation of patients, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by letters patent is set forth in the appended claims.

What is claimed is:

1. A patient's transportation device, comprising a support provided with handle means; wheels on which said support is supported, said wheels being vertically adjustable, said wheels being adjustable by an adjustment selected from the group consisting of an individual adjustment of wheels and an adjustment of wheels in pairs: and sensor means formed so that said wheels are vertically adjustable with a control of said sensor means.

2. A patient's transportation device as defined in claim 1, wherein said wheels are adjustable individually and in pairs.

3. A patient's transportation device as defined in claim 1, wherein said wheels are lowerable into a lower side of said support so that said wheels are at most insignificantly project downwardly from said lower side of said support.

4. A patient's transportation device as defined in claim 1; and further comprising telescopable pipes, said wheels are arranged on said telescopable pipes.

5. A patient's transportation device as defined in claim 4, wherein said telescopable pipes are extendable and retractable by power means.

6. A patient's transportation device as defined in claim 5, wherein said telescopable pipes are extendable and retractable by hydraulic power means.

7. A patient's transportation device as defined in claim 5, wherein said telescopable pipes are extendable and retractable by electrical power means.

8. A patient's transportation device as defined in claim 4, wherein said telescopable pipes are supported turnably relative to a lower side of said support.

9. A patient's transportation device as defined in claim 1; and further comprising at least one sliding body supported at least in a head region of said support on a lower side of said support.

10. A patient's transportation device as defined in claim 9, wherein said sliding body is formed as a roller.

11. A patient's transportation device as defined in claim 1; and further comprising a chassis which is removable from said support, said wheels being arranged on said removable chassis.

12. A patient's transportation device as defined in claim 1; and further comprising a chassis, said support being movable onto said chassis from two sides.

13. A patient's transportation device as defined in claim 1, wherein said wheels are provided with tires.

14. A patient's transportation device as defined in claim 1, wherein said wheels are formed as wheels which can be steered and folded.

15. A patient's transportation device as defined in claim 1, wherein said wheels are supported by spring means.

16. A patient's transportation device as defined in claim 1, wherein said wheels are provided with a chain driving mechanism.

17. A patient's transportation device as defined in claim 1; and further comprising a padded lying member which is removably arranged in said support.

18. A patient's transportation device as defined in claim 17, wherein said lying member is composed of a material selected from the group consisting of synthetic plastic and carbon fiber compound material.

19. A patient's transportation device as defined in claim 17, wherein said lying member is foldable in a transverse direction at least at one point and provided with belts, so that a patient's transportation is possible in a sitting position.

20. A patient's transportation device as defined in claim 17; and further comprising means for compensation of impact and inclination of said support provided between said lying member and said support.

21. A patient's transportation device as defined in claim 17; and further comprising a power system provided between said support and said lying member for inclination and impact compensation.

22. A patient's transportation device as defined in claim 21, wherein said power system is a sensor-controlled hydraulic system.

23. A patient's transportation device as defined in claim 21, wherein said power system is a sensor-controlled hydraulic system.

24. A patient's transportation device as defined in claim 1; and further comprising a control device with two-hand actuation for operating all functions of the patient's transportation device.

25. A patient's transportation device as defined in claim 1; and further comprising devices for monitoring and/or maintaining vital parameters of a patient and integrated in said support.

26. A patient's transportation device as defined in claim 1; and further comprising a chassis, and devices for monitoring and/or maintaining vital parameters of a patient integrated in said chassis.

27. A patient's transportation device as defined in claim 26, wherein said monitoring devices are formed so as to monitor a heart activity, a blood pressure, and a body temperature.

28. A patient's transportation device as defined in claim 26, wherein said maintaining devices include at least one ventilation device.

29. A patient's transportation device as defined in claim 26, wherein said maintaining devices include a pulse oximeter, a capnograph and a secretion aspirator.

30. A patient's transportation device as defined in claim 1; and further comprising means forming receptacles for poles for mounting monitors, injection pumps, and illumination devices.

31. A patient's transportation device as defined in claim 1; and further comprising at least one battery for a current supply.

32. A patient's transportation device as defined in claim 1; and further comprising a connector to an electrical network for a current supply.

* * * * *